(12) United States Patent
Hamacher et al.

(10) Patent No.: US 11,727,474 B2
(45) Date of Patent: Aug. 15, 2023

(54) METHODS AND APPARATUS FOR SELLING PAINT PRODUCTS IN STORES THAT TRADITIONALLY DO NOT SELL PAINT

(71) Applicant: Behr Process Corporation, Santa Ana, CA (US)

(72) Inventors: Leonard Ludovic Hamacher, Carlsbad, CA (US); Sunil Palakodati, Novi, MI (US); Jill Dawn Ehnes, Carmel, IN (US); Nicholas Robert Thompson, Jr., Dieland, FL (US); Miles Anthony Poole, High Point, NC (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 16/413,819

(22) Filed: May 16, 2019

(65) Prior Publication Data
US 2019/0272587 A1 Sep. 5, 2019

Related U.S. Application Data

(63) Continuation of application No. 14/972,707, filed on Dec. 17, 2015, now Pat. No. 10,296,969.
(Continued)

(51) Int. Cl.
*G06Q 30/06* (2023.01)
*G06Q 30/0601* (2023.01)

(52) U.S. Cl.
CPC ..... *G06Q 30/0643* (2013.01); *G06Q 30/0613* (2013.01); *G06Q 30/0631* (2013.01); *G06Q 30/0635* (2013.01)

(58) Field of Classification Search
CPC ......... G06Q 30/06–08; G06Q 30/0643; G06Q 30/0613; G06Q 30/0631; G06Q 30/0635
(Continued)

(56) References Cited

U.S. PATENT DOCUMENTS 6,343,264 B1    1/2002  Fenton et al.
6,563,510 B1 *  5/2003  Rice ......................... G01J 3/46
                                                   345/530
(Continued)

FOREIGN PATENT DOCUMENTS

CA    2985789 A1 *  2/2014
CN    1508761 A     6/2004
(Continued)

OTHER PUBLICATIONS

"X-Rite Introduces Personal Designer PLUS Software", Jun. 30, 2012, Close-Up Media, Inc. (Year: 2012).*
(Continued)

*Primary Examiner* — Matthew E Zimmerman
*Assistant Examiner* — Thomas Joseph Sullivan
(74) *Attorney, Agent, or Firm* — Harness, Dickey & Pierce, P.L.C.

(57) ABSTRACT

A sales person at a retail store which traditionally does not sell paint assists a consumer in selecting and purchasing a non-paint product and thereafter employs a computer terminal and display in conjunction with a website operated by a paint manufacturer to provide a paint color recommendation to the consumer. The sales person may thereafter respond to consumer selection of a particular paint color by employing an on-line electronic ordering tool to transmit a paint order to an order processing terminal located at a paint manufacturer facility. Thereafter, the paint manufacturer may proceed to process the order, perform tinting and shaking steps to formulate paint of the particular color,
(Continued)

package the tinted paint, and cause the packaged paint to be shipped to the consumer.

14 Claims, 4 Drawing Sheets

Related U.S. Application Data

(60) Provisional application No. 62/096,070, filed on Dec. 23, 2014.

(58) Field of Classification Search
USPC .................................... 705/26.1–27.2, 26.41
See application file for complete search history.

(56) References Cited

U.S. PATENT DOCUMENTS

| | | | |
|---|---|---|---|
| 7,193,632 B2* | 3/2007 | Rice ........................ | G07F 17/16 345/589 |
| 8,352,332 B2* | 1/2013 | Pesicek ................... | G07F 17/00 702/155 |
| 2002/0184232 A1 | 12/2002 | Menner | |
| 2005/0099630 A1* | 5/2005 | Reynolds ............ | G06F 16/2455 356/402 |
| 2005/0100210 A1* | 5/2005 | Rice ........................ | G06Q 30/02 382/162 |
| 2005/0102349 A1 | 5/2005 | Rice et al. | |
| 2005/0146531 A1 | 7/2005 | Rice et al. | |
| 2005/0160077 A1* | 7/2005 | Howes ................ | G06Q 30/0621 |
| 2006/0195369 A1* | 8/2006 | Webb ................ | G06Q 30/0603 705/26.81 |
| 2009/0228143 A1* | 9/2009 | Hughes ................ | B01F 33/846 700/239 |
| 2009/0248199 A1* | 10/2009 | Milhorn .............. | B01F 33/8442 705/16 |
| 2012/0046987 A1 | 2/2012 | Lee | |
| 2012/0170840 A1 | 7/2012 | Caruso et al. | |
| 2012/0236144 A1* | 9/2012 | Rao ........................ | H04N 1/60 705/26.7 |
| 2014/0114809 A1* | 4/2014 | Ruberia ................. | G06Q 30/06 705/26.61 |
| 2014/0172627 A1* | 6/2014 | Levy ...................... | G06Q 30/02 705/26.7 |
| 2015/0228002 A1* | 8/2015 | Berger ............... | G06Q 30/0627 705/26.63 |

FOREIGN PATENT DOCUMENTS

| | | | | | |
|---|---|---|---|---|---|
| CN | | 1902652 A | 1/2007 | | |
| CN | | 101194281 A | 6/2008 | | |
| WO | WO-2008045418 A1 | * | 4/2008 | .......... | B01F 13/1055 |
| WO | WO-2014070914 A1 | * | 5/2014 | ......... | G06Q 30/0627 |

OTHER PUBLICATIONS

Cavanaugh, Thomas, "The Kiosk Culture: Reconciling The Performance Support Paradox In The Post Modern Age of Machines", 2006, University of Central Florida, (Year: 2006).*
Marguier, J., et al, "A Home Decor expert in your camera," Nov. 2009, Proceedings of the IS&T/SID 17th Color Imaging Conference (Year: 2009).*
Preiser, Amy, "Color Matching: Does It Really Work?", Feb. 3, 2009, House Beautiful (Year: 2009).*
Sennebogen, Emilie, "How can a machine match a paint color perfectly?," Jun. 16, 2009, HowStuffWorks (Year: 2009).*
International Search Report regarding International Application No. PCT/US2015/066490, dated Apr. 6, 2016.
Office Action regarding Chilean Patent Application No. 201701643, dated Oct. 18, 2018. Translation provided by Clarke Modet & Co.
Written Opinion regarding International Application No. PCT/US2015/066490, dated Apr. 6, 2016.
International Preliminary Report on Patentability regarding International Application No. PCT/US2015/066490, dated Jun. 27, 2017.
First Office Action regarding Chinese Patent Application No. 201580070756.6, dated Mar. 31, 2020. Translation provided by Deacons Law Office. Translation provided by Deacons.
First Office Action regarding Mexican Patent Application No. MX/a/2017/008279, dated Oct. 1, 2020. Translation provided by Clarke Modet & Co.
Third Office Action regarding Mexican Patent Application No. MX/2017/008279, dated Oct. 28, 2021. Translation provided by Clarke Modet & Co.
Office Action regarding Argentinian Application No. 20150104229, dated Jul. 12, 2021. Translation provided by Clarke Modet & Co.
Office Action regarding Canadian Patent Application No. 2,964,970 dated Jul. 13, 2021.
First Preliminary Rejection regarding Korean Patent Application No. 10-2017-7016645, dated Aug. 26, 2022. Translation provided by S.Y. Cha Patent Office.
Office Action regarding Canadian Patent Application No. 2,964,970, dated Aug. 24, 2022.
Second Office Action regarding Mexican Patent Application No. MX/a/2020/012844, dated Apr. 4, 2023. Translation provided by Clarke Modet & Co.

* cited by examiner

METHODS AND APPARATUS FOR SELLING PAINT PRODUCTS IN STORES THAT TRADITIONALLY DO NOT SELL PAINT

CROSS REFERENCE TO RELATED APPLICATIONS

This application is a continuation of U.S. application Ser. No. 14/972,707, filed Dec. 17, 2015, entitled, "Methods And Apparatus For Selling Paint Products in Stores Which Traditionally Do Not Sell Paint," which claims the benefit of and priority to U.S. Provisional Patent Application Ser. No. 62/096,070, filed Dec. 23, 2014, entitled, "Methods and Apparatus For Selling Paint In Stores That Traditionally Do Not Sell Paint," the contents of which is hereby incorporated by reference herein in its entirety.

FIELD OF THE DISCLOSURE

The subject disclosure relates to paint product selection and ordering methods and apparatus, as well as to methods and apparatus for selling paint products in stores that traditionally do not sell paint.

RELATED ART

In the past, various specialty retail stores such as those which sell flooring products have traditionally not sold paint products.

SUMMARY OF THE INVENTION

In an illustrative embodiment, a method is provided for selling paint at a store which traditionally sells a first type of product but that traditionally does not sell paint, for example such as a flooring retailer, according to which a sales person at the store assists a consumer in selecting and purchasing the first type of product and thereafter employs a computer terminal and display located at the store and a website operated by a paint manufacturer to provide a paint color selection recommendation to the consumer. In one embodiment, the website is configured to assist in generating one or more interactive display screens on a computer controlled display which provides paint color selection assistance. The sales person may thereafter respond to a consumer paint color selection by employing an on-line electronic ordering tool to transmit a paint order for paint of the selected color to an order processing terminal located at a paint manufacturer facility. Thereafter, the paint manufacturer may proceed to process the order, perform tinting and shaking steps to formulate paint of the selected color, package the tinted paint, and cause the packaged paint to be shipped to the consumer.

DETAILED DESCRIPTION OF THE PREFERRED EMBODIMENTS

Figure 1:
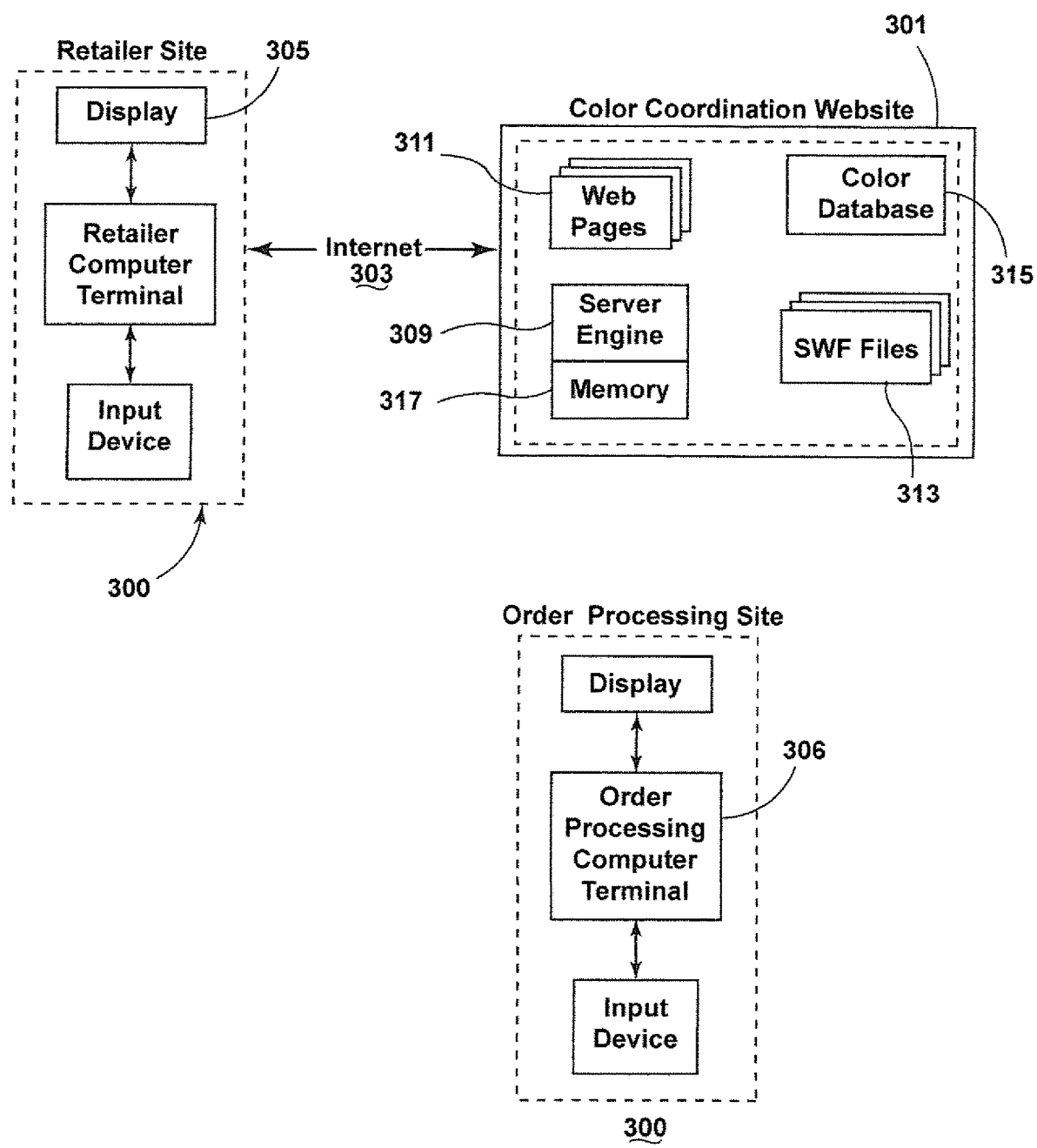
FIG. 1 is a system block diagram illustrative of apparatus for performing methods as described herein.

FIG. 1 illustrates a block diagram of a system in which a remote retail site computer 300 may access a paint color selection and coordination website 301. The website 301 may be coupled to the internet 303 in order to provide access to a large number of remote terminals/computers 300. Each remote computer 300 controls a display apparatus 305, which may comprise, for example, one or more CRTs or flat screen computer monitors or displays. One of the remote computers 300 may comprise an order processing computer terminal 306 whose functionality is discussed in more detail below.

The website 301 may comprise a server engine 309 comprising one or more computers, or servers, associated memory 317 and server software such as a server operating system and server application programs. The website 301 is arranged to store and transmit a plurality of related documents or webpages 311 in digital format, for example, such as HTML documents, and further may include SWF files 313 and a color data base 315 where color data is stored as described, for example, in U.S. Pat. No. 7,999,825, entitled, "Color Selection and Coordination System," incorporated herein by reference in its entirety. It will be appreciated that the computer controlled display apparatus transforms the digital format webpages into static and/or animated interactive visual images for an end user. The associated memory 317 may comprise a computer readable digital storage media or medium, such as, for example, hard disc storage.

A user may interact with the website 301 over the internet 303 or other communication medium or media via selection operations performed on webpage display screens presented to the user via the display apparatus 305 of a remote computer 300. Such selection operations may be performed by, for example, a keyboard, a cursor directed by a mouse, a track ball, a touch screen, or other data entry means. In such a manner, various links presented on the display apparatus 305 may be selected by various point and click, point and touch, or other selection operations.

In various embodiments, remote computers 300 may comprise or form part of a computer terminal, a personal digital assistant (PDA), a wireless telephone, a "smart phone," a laptop, desktop or notebook computer, and/or the like. In various embodiments, the communications medium or media may comprise the internet or other media such as a local area network (LAN), a wide area network (WAN), a wireless network, an intranet, and/or the like.

In one embodiment, website functionality may be implemented in non-transitory software stored on a computer readable storage medium or media and executed by a suitable device, for example, such as one or more digital processors or computers, which may comprise part of a web server or other suitable apparatus. In other embodiments, such software can be located on a personal computer or similar device to generate displays on a flat panel or other display device at a user site without involvement of a server or the internet. In such case, display screens are generated which may have the same content as webpages, such that the terms "webpage," "screen display," "display," and similar terms are used interchangeably herein. Illustrative screens displays and functionality of an illustrative embodiment may be implemented in one or more application programs, which may be written in, for example, HTTP, PHP, MySQL, JavaScript, XMPP Server, Solr Server, LAMP technology stack, Java, Laszlo Presentation Server or C++ and, which may run, for example, on a Windows XP or other operating system. Various display screens and functionality of illustrative embodiments are described below.

Figure 2:
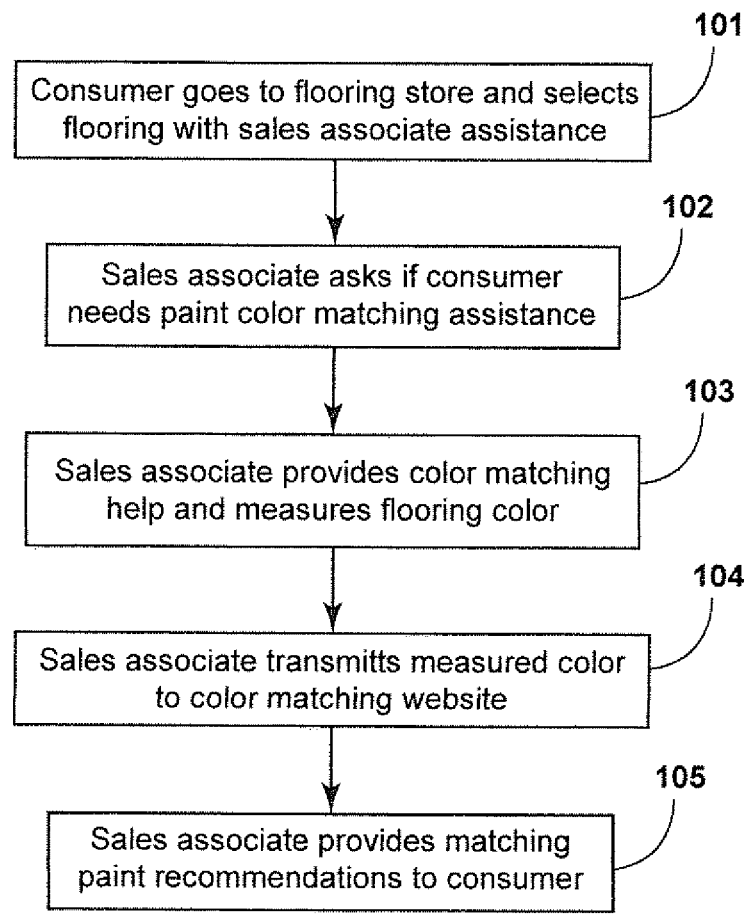
FIG. 2 is a flow diagram illustrating initial steps of an illustrative method.

According to an illustrative method shown in FIG. 2, a consumer who wishes to buy flooring for a home goes to a flooring store location and selects the flooring (step 101)

with the assistance of a flooring sales associate. As part of the process, the flooring sales associate asks if the consumer needs assistance with paint and/or paint color matching (step 102). If the consumer needs color match help, the sales associate measures the color of the flooring using a spectrophotometer or other suitable device (step 103). The flooring sales associate then employs a retail site computer 300 to transmit the measurement to a color matching website application program, for example, such as ColorSmart® by Behr Process Corporation (step 104). The associate obtains matching paint recommendations, and provides them to the customer/consumer (step 105). Illustrative color selection and coordination functionality and the manner of implementing same in website and other environments are described in U.S. Patent Application Publications 2014/0075361 A1 and 2008/0228599 incorporated by reference herein.

Figure 3:
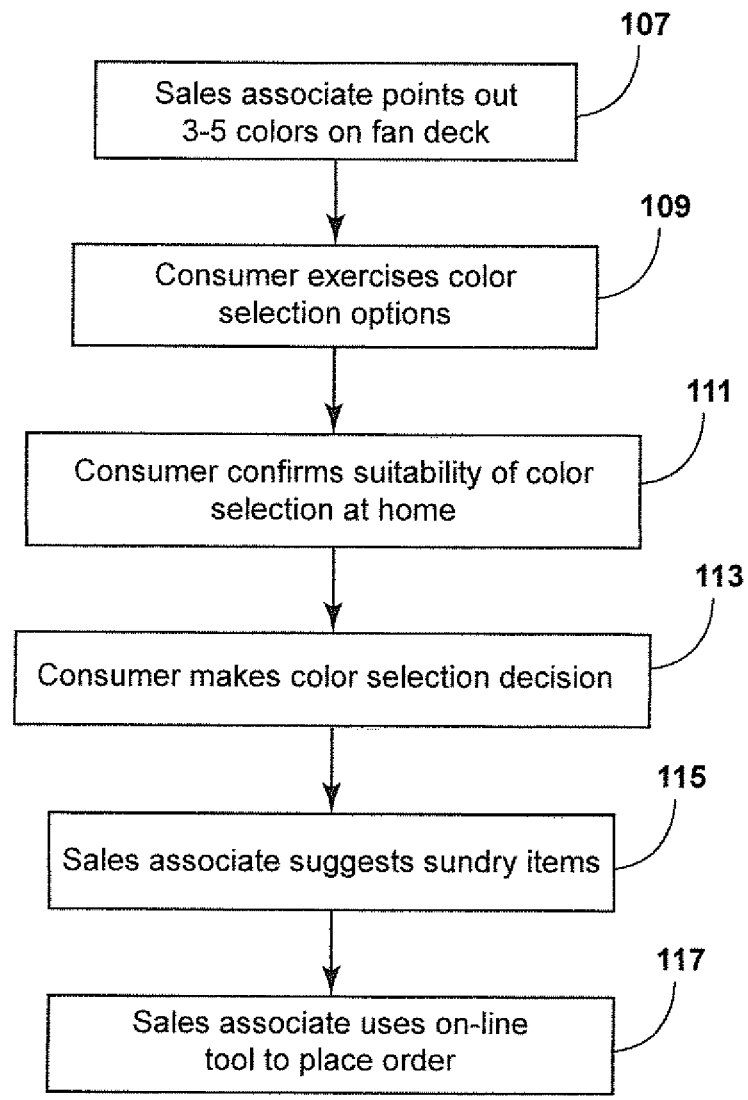
FIG. 3 is a flow diagram illustrating subsequent steps in the method of FIG. 2.

In one embodiment, the flooring sales associate may suggest 3-5 colors, for example, by providing the consumer with a color fan card or fan deck and then pointing out the 3-5 colors as illustrated at step 107 of FIG. 3. The consumer may then exercise one or more paint color selection options in step 109. In an illustrative embodiment, these options may include (a) checking out the fan deck to take home (b) ordering a wet sample of one or more colors, packaged, for example, in small "sample size" jars or cans or (c) selecting a color choice and placing an order for paint having the selected color. The consumer may also be provided with color chips of the 3-5 colors to take home. In various embodiments, wet paint samples may be provided in a bottle with an applicator such as a brush or sponge, or in a smaller foil packet type dispenser, e.g., similar to a ketchup packet dispenser.

In the case of option (a) or (b), the consumer can take the fan deck or paint sample home, step 111, to confirm the suitability of one or more particular colors for the particular project which the consumer has in mind. Once the consumer has made a selection decision, step 113, the sales associate may suggest purchase of additional related items, such as paint brushes and the like, step 115. In one embodiment, once the consumer has determined to order paint and/or other items, the flooring sales associate uses an on-line electronic ordering tool accessed via a retail site computer, e.g. 300, to order the products, step 117.

Figure 4:
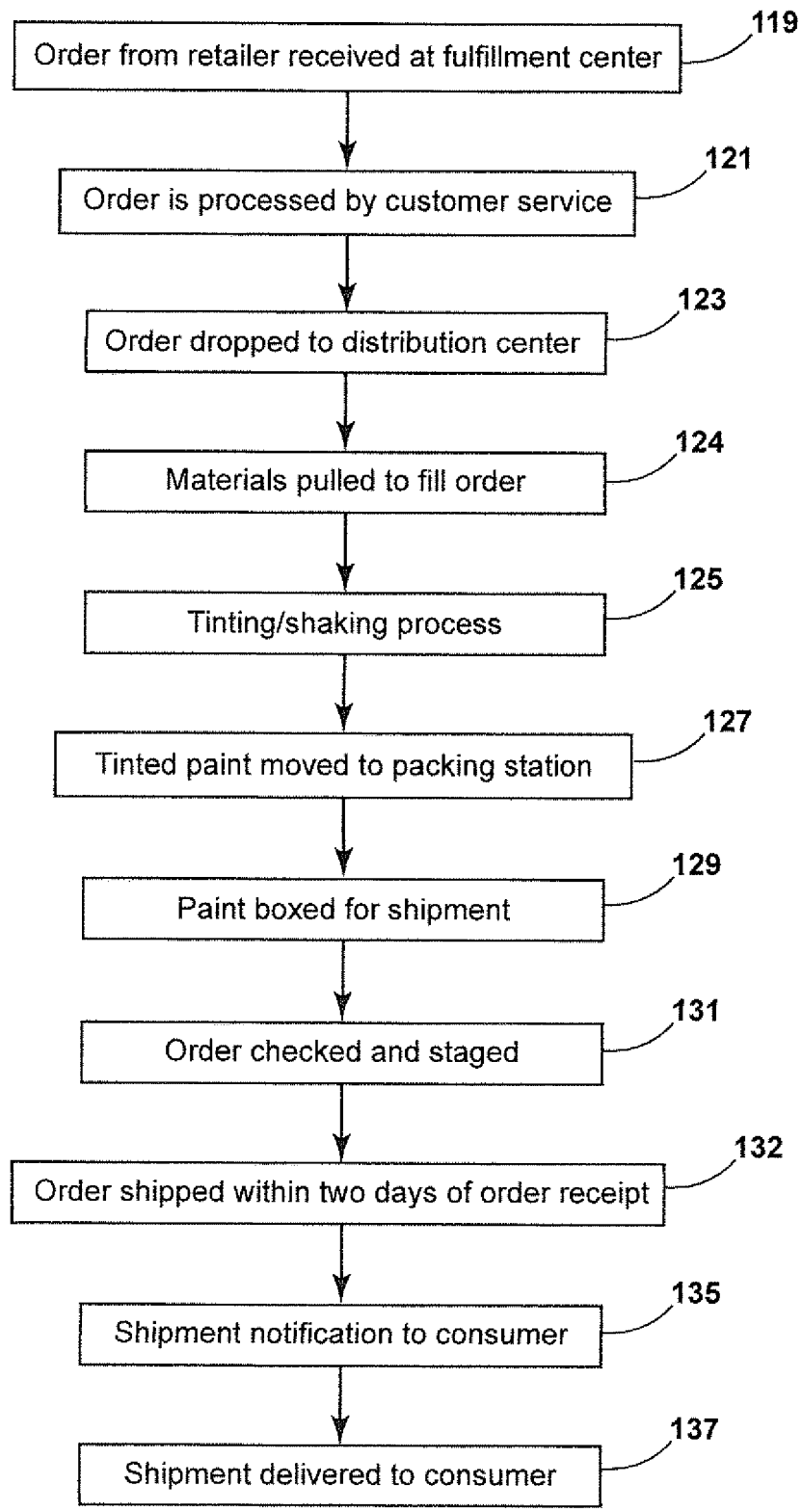
FIG. 4 is a flow diagram illustrating order fulfillment steps according to one embodiment.

FIG. 4 shows illustrative order fulfillment steps according to an illustrative embodiment. According to this embodiment, the on-line order is first received at the fulfillment center computer terminal 306, step 119, after which customer service processes the order, step 121. The order is then dropped to a distribution center, step 123, the materials are pulled to fulfill the order, step 124, and the paint is formulated and moved through a tinting and shaking stage, step 125. In an illustrative embodiment, the paint may be KILZ brand paint, as manufactured by Behr Process Corporation, Santa Ana, Calif. In one embodiment, the order fulfillment computer terminal 306 may communicate directly with a retail site computer 300, while in another embodiment, the order may be directed to the website 301 and then to the order processing computer terminal 306.

After the paint is moved through the tinting and shaking process, step 125, the tinted paint is moved to a packing station, step 127, and boxed for direct-to-the-consumer shipment, step 129, employing packing materials for example such as clips, bags, and stabilizing inserts. Additional items, such as color chips may also be packaged, for example, with orders of paint samples. The paint orders are thereafter checked and staged for shipment, step 131, and then shipped, step 132, for example, within two days of receipt of the order. Shipping and tracking information may then be sent to the consumer, step 135, and the order delivered, for example, within 3-5 days of receipt of the order, step 137. As will be appreciated, a number of the steps of FIG. 4 may be performed at the facilities of a manufacturer of paint and other coatings ("coating manufacturer"), for example, such as steps 119, 121, 123, 124, 125, 127 and 131.

In an illustrative embodiment, a retail site of a company which traditionally sells only flooring may be adapted to sell paint products by employing the above described apparatus and procedure to generate orders for paint and related products and communicate those orders, for example, over the internet or other communication medium to a paint or coatings manufacturer who then formulates and mixes the paint, primer, and/or other coating product, packages it, and ships it out to the customer or retail site. In this manner, the flooring company avoids various drawbacks attendant to traditional retail paint stores, such as the necessity to maintain: (a) inventory, (b) paint formulation equipment such as tinting and mixing equipment, (c) display racks for paint chips and brochures, etc., and (d) employees having detailed knowledge of paint products and formulation procedures. The flooring or other company may thus employ its customary design personnel to interact with the customer to select paint and paint related products with only a modicum of additional training for such design personnel From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:
1. A method comprising:
generating a digital representation of a color of a non-paint product for sale at a store that sells the non-paint product and that does not maintain an inventory of paint products;
transmitting the digital representation of the color of the non-paint product to a computer terminal at the store, the computer terminal having a computer controlled display;
transmitting the digital representation of the color from the computer terminal to a webserver remote from the computer terminal and operated by a paint manufacturer, the webserver providing a website with a color coordination application program to the computer terminal, the color coordination application program being configured to generate at least one interactive display screen on the computer controlled display to provide paint color selection assistance, receive the digital representation of the color of the non-paint product, determine at least one coordinating color for the color of the non-paint product, and display the at least one coordinating color on the computer controlled display of the computer terminal, wherein a sales person at the store employs the computer terminal, the computer controlled display, and the website to provide a paint color recommendation including a plurality of paint colors to a consumer based on the at least one coordinating color, wherein the consumer is provided with at least one of a plurality of color fan cards and a plurality of paint samples corresponding to the plurality of paint colors that the consumer takes to a home of the consumer to confirm suitability for a particular project;

receiving, with the computer terminal at the store, a first selection of a particular paint color inputted to the computer terminal by the sales person at the store after the consumer has returned to the store from the home of the consumer and communicated a selection decision to the sales person selecting the particular paint color from the plurality of paint colors of the paint color recommendation;

receiving, with the computer terminal at the store, a second selection of at least one additional related item, including at least one paint brush, inputted to the computer terminal by the sales person at the store;

generating, with the computer terminal at the store, a paint order for paint of the particular paint color and for the at least one additional related item; and transmitting, with the computer terminal at the store, the paint order for paint of the particular paint color and for the at least one additional related item directly to an order processing terminal located at an order processing site that is operated by the paint manufacturer and remote from the webserver and from the computer terminal without communicating the paint order to the webserver;

wherein the order processing terminal receives the paint order and the paint manufacturer processes the paint order received by the order processing terminal and causes packaged paint corresponding to the paint order and the at least one additional related item to be shipped directly to the home of the consumer without being transferred to the store.

2. The method of claim 1, wherein the paint manufacturer performs tinting and shaking steps to formulate tinted paint of the particular paint color and packages the tinted paint as the paint order to be shipped directly to the consumer.

3. The method of claim 1 wherein the non-paint product is flooring.

4. The method of claim 1 wherein the store is a floor covering store.

5. The method of claim 1 wherein the digital representation is generated by a spectrophotometer.

6. The method of claim 1 wherein said color coordination application program comprises a client application transmitted from the webserver to the computer terminal at the store.

7. The method of claim 1, wherein the computer terminal at the store uses an electronic ordering tool to (i) generate the paint order for paint of the particular color and for the at least one additional related item, and (ii) transmit the paint order for paint of the particular paint color and for the at least one additional related item directly to the order processing terminal located at the order processing site that is operated by the paint manufacturer and remote from the webserver and from the computer terminal without communicating the paint order to the webserver.

8. A system comprising:

a computer terminal located at a store that sells a non-paint type product and that does not maintain an inventory of paint products, the computer terminal having a computer controlled display and being configured to receive a digital representation of a color of a non-paint product for sale at the store that sells the non-paint type product;

a webserver remote from the computer terminal and operated by a paint manufacturer, the webserver being configured to provide a website with a color coordination application program to the computer terminal;

wherein:

the color coordination application program is configured to generate at least one interactive display screen on the computer controlled display to provide paint color selection assistance, receive the digital representation of the color of the non-paint product, determine at least one coordinating color for the color of the non-paint product, and display the at least one coordinating color on the computer controlled display of the computer terminal, wherein a sales person at the store employs the computer terminal, the computer controlled display, and the website to provide a paint color recommendation including a plurality of paint colors to a consumer based on the at least one coordinating color, wherein the consumer is provided with at least one of a plurality of color fan cards and a plurality of paint samples corresponding to the plurality of paint colors that the consumer takes to a home of the consumer to confirm suitability for a particular project;

the computer terminal is configured to receive a first selection of a particular paint color inputted to the computer terminal by the sales person at the store after the consumer has returned to the store from the home of the consumer and communicated a selection decision to the sales person selecting the particular paint color from the plurality of paint colors of the paint color recommendation, to receive a second selection of at least one additional related item, including at least one paint brush, inputted to the computer terminal by the sales person at the store, to generate a paint order for paint of the particular paint color and for the at least one additional related item, and transmit the paint order for paint of the particular paint color and for the at least one additional related item, directly to an order processing terminal located at an order processing site that is operated by the paint manufacturer and remote from the webserver and from the computer terminal without communicating the paint order to the webserver; and the order processing terminal receives the paint order and the paint manufacturer processes the paint order received by the order processing terminal and causes packaged paint corresponding to the paint order and the at least one additional related item to be shipped directly to the home of the consumer without being transferred to the store.

9. The system of claim 8, wherein the paint manufacturer performs tinting and shaking steps to formulate tinted paint of the particular paint color and packages the tinted paint as the paint order to be shipped to the consumer.

10. The system of claim 8 wherein the non-paint product is flooring.

11. The system of claim 8 wherein the store is a floor covering store.

12. The system of claim 8 wherein the digital representation is generated by a spectrophotometer.

13. The system of claim 8 wherein said color coordination application program comprises a client application transmitted from the webserver to the computer terminal at the store.

14. The system of claim 8, wherein the computer terminal at the store is configured to use an electronic ordering tool to (i) generate the paint order for paint of the particular color and for the at least one additional related item, and (ii) transmit the paint order for paint of the particular paint color and for the at least one additional related item directly to the order processing terminal located at the order processing site that is operated by the paint manufacturer and remote from the webserver and from the computer terminal without communicating the paint order to the webserver.

* * * * *